US010253986B2

(12) United States Patent
Lacy et al.

(10) Patent No.: US 10,253,986 B2
(45) Date of Patent: Apr. 9, 2019

(54) ARTICLE AND METHOD OF FORMING AN ARTICLE

(71) Applicant: GENERAL ELECTRIC COMPANY, Schenectady, NY (US)

(72) Inventors: Benjamin Paul Lacy, Greer, SC (US); Srikanth Chandrudu Kottilingam, Simpsonville, SC (US); Sandip Dutta, Greenville, SC (US); David Edward Schick, Greenville, SC (US)

(73) Assignee: General Electric Company, Schenectady, NY (US)

( * ) Notice: Subject to any disclaimer, the term of this patent is extended or adjusted under 35 U.S.C. 154(b) by 752 days.

(21) Appl. No.: 14/847,347

(22) Filed: Sep. 8, 2015

(65) Prior Publication Data
US 2017/0067636 A1 Mar. 9, 2017

(51) Int. Cl.
*F01D 25/12* (2006.01)
*F01D 5/18* (2006.01)
(Continued)

(52) U.S. Cl.
CPC .............. *F23R 3/06* (2013.01); *B22F 3/1055* (2013.01); *B22F 5/009* (2013.01); *B22F 5/04* (2013.01);
(Continued)

(58) Field of Classification Search
None
See application file for complete search history.

(56) References Cited

U.S. PATENT DOCUMENTS 3,475,107 A * 10/1969 Auxier .................... F01D 5/189
 415/115
3,540,810 A * 11/1970 Kercher .................. F01D 5/189
 415/115
(Continued)

FOREIGN PATENT DOCUMENTS

EP 0 182 588 A1 5/1986
EP 0 599 055 A1 6/1994
(Continued)

OTHER PUBLICATIONS

Extended European Search Report and Opinion issued in connection with related EP Application No. 16185770.1 dated Jan. 5, 2017.
(Continued)

*Primary Examiner* — Peter A Salamon
(74) *Attorney, Agent, or Firm* — Charlotte C. Wilson; Ernest G. Cusick; Frank A. Landgraff

(57) ABSTRACT

A cooling article and method of forming a cooling article are provided. The cooling article includes a body portion separating an inner region and an outer region, an aperture in the body portion, the aperture fluidly connecting the inner region to the outer region, and a cooling feature extending away from an outer surface of the body portion. The cooling feature disturbs fluid flow in the outer region. The method of forming a cooling article includes forming a body portion defining an inner region and an outer region, forming an aperture in the body portion, the aperture fluidly connecting the inner region to the outer region, and forming a cooling feature extending away from an outer surface of the body portion. The cooling article is arranged and disposed for insertion within a hot gas path component of a turbine engine.

17 Claims, 6 Drawing Sheets

(51) Int. Cl.
*F23R 3/06* (2006.01)
*B22F 3/105* (2006.01)
*B22F 5/00* (2006.01)
*B33Y 10/00* (2015.01)
*B33Y 80/00* (2015.01)
*B22F 5/04* (2006.01)
*B22F 5/10* (2006.01)

(52) U.S. Cl.
CPC ............... *B22F 5/10* (2013.01); *B33Y 10/00* (2014.12); *B33Y 80/00* (2014.12); *F01D 5/188* (2013.01); *F01D 5/189* (2013.01); *B22F 2005/005* (2013.01); *F05D 2230/31* (2013.01); *F23R 2900/03045* (2013.01); *Y02P 10/295* (2015.11)

(56) References Cited

U.S. PATENT DOCUMENTS

| | | | | |
|---|---|---|---|---|
| 4,056,332 A * | 11/1977 | Meloni | ............... | F01D 5/188 415/115 |
| 4,252,501 A * | 2/1981 | Peill | ............... | F01D 5/189 415/115 |
| 4,312,624 A * | 1/1982 | Steinbauer, Jr. | ............... | F01D 5/189 415/115 |
| 4,482,295 A * | 11/1984 | North | ............... | F01D 5/189 415/115 |
| 5,207,556 A * | 5/1993 | Frederick | ............... | F01D 5/189 415/115 |
| 5,464,322 A * | 11/1995 | Cunha | ............... | F01D 5/187 415/115 |
| 5,516,260 A * | 5/1996 | Damlis | ............... | F01D 5/189 415/115 |
| 5,586,866 A * | 12/1996 | Wettstein | ............... | F01D 5/189 416/96 A |
| 5,772,398 A * | 6/1998 | Noiret | ............... | F01D 5/189 415/115 |
| 6,000,908 A * | 12/1999 | Bunker | ............... | F01D 5/189 165/908 |
| 6,065,928 A * | 5/2000 | Rieck, Jr. | ............... | F01D 5/189 415/115 |
| 6,183,192 B1 * | 2/2001 | Tressler | ............... | F01D 5/189 415/115 |
| 6,200,087 B1 * | 3/2001 | Tung | ............... | F01D 5/186 415/115 |
| 6,237,344 B1 * | 5/2001 | Lee | ............... | F01D 5/186 165/908 |
| 6,283,708 B1 * | 9/2001 | Zelesky | ............... | F01D 5/189 416/97 R |
| 6,391,251 B1 * | 5/2002 | Keicher | ............... | B05B 7/14 419/7 |
| 6,406,260 B1 * | 6/2002 | Trindade | ............... | F01D 5/187 415/115 |
| 6,742,984 B1 * | 6/2004 | Itzel | ............... | F01D 5/189 29/889.722 |
| 7,008,185 B2 * | 3/2006 | Peterman | ............... | F01D 5/189 415/115 |
| 7,246,993 B2 * | 7/2007 | Bolms | ............... | F01D 25/12 415/116 |
| 7,497,655 B1 * | 3/2009 | Liang | ............... | F01D 5/189 415/1 |
| 7,789,125 B2 | 9/2010 | Mayer et al. | | |
| 8,127,552 B2 | 3/2012 | Schumacher et al. | | |
| 8,137,056 B2 | 3/2012 | Fujimoto et al. | | |
| 8,152,468 B2 * | 4/2012 | Propheter-Hinckley | ............... | F01D 5/189 416/96 A |
| 8,444,376 B2 | 5/2013 | Krueckels et al. | | |
| 9,347,324 B2 * | 5/2016 | Lee | ............... | F01D 5/188 |
| 2002/0090294 A1 * | 7/2002 | Keith | ............... | F01D 5/189 415/115 |
| 2003/0031555 A1 * | 2/2003 | Noe | ............... | F01D 5/189 415/115 |
| 2003/0068222 A1 * | 4/2003 | Cunha | ............... | F01D 5/18 415/115 |
| 2004/0062649 A1 * | 4/2004 | Schopf | ............... | F01D 5/189 416/97 R |
| 2004/0170496 A1 * | 9/2004 | Powis | ............... | F01D 5/189 415/189 |
| 2004/0170499 A1 * | 9/2004 | Powis | ............... | F01D 5/189 416/97 R |
| 2004/0226701 A1 | 11/2004 | Lomax, Jr. et al. | | |
| 2005/0135921 A1 * | 6/2005 | Busch | ............... | F01D 5/189 415/115 |
| 2007/0169992 A1 | 7/2007 | Wasif et al. | | |
| 2009/0010765 A1 * | 1/2009 | Propheter-Hinckley | ............... | F01D 5/147 416/97 R |
| 2009/0324385 A1 * | 12/2009 | Liang | ............... | F01D 5/187 415/115 |
| 2010/0124485 A1 * | 5/2010 | Tibbott | ............... | F01D 5/188 415/115 |
| 2010/0232946 A1 * | 9/2010 | Propheter-Hinckley | ............... | F01D 5/189 415/177 |
| 2010/0247284 A1 * | 9/2010 | Gregg | ............... | F01D 5/189 415/1 |
| 2010/0247327 A1 * | 9/2010 | Malecki | ............... | F01D 5/189 416/96 A |
| 2010/0254824 A1 * | 10/2010 | Naik | ............... | F01D 5/186 416/97 R |
| 2011/0123351 A1 * | 5/2011 | Hada | ............... | F01D 5/189 416/97 R |
| 2013/0081401 A1 | 4/2013 | Kim | | |
| 2013/0104567 A1 * | 5/2013 | Konitzer | ............... | F01D 5/189 60/806 |
| 2013/0156549 A1 * | 6/2013 | Maldonado | ............... | F01D 5/189 415/115 |
| 2014/0064913 A1 | 3/2014 | Adavikolanu et al. | | |
| 2014/0093379 A1 * | 4/2014 | Tibbott | ............... | F01D 5/189 416/224 |
| 2014/0093392 A1 | 4/2014 | Tibbott et al. | | |
| 2014/0099476 A1 | 4/2014 | Subramanian et al. | | |
| 2014/0105726 A1 * | 4/2014 | Lee | ............... | F01D 5/188 415/115 |

FOREIGN PATENT DOCUMENTS

| | | |
|---|---|---|
| EP | 0 698 725 A2 | 2/1996 |
| EP | 0 887 515 A1 | 12/1998 |
| EP | 2256297 B1 | 12/2010 |
| EP | 2 369 235 A2 | 9/2011 |
| EP | 2 708 296 A2 | 3/2014 |
| EP | 2 716 868 A2 | 4/2014 |
| EP | 2 853 323 A2 | 4/2015 |
| GB | 2 492 374 A | 1/2013 |
| JP | 2011-089461 A | 5/2011 |
| JP | 2012-202342 A | 10/2012 |
| WO | 03/062607 A1 | 7/2003 |
| WO | 2013/160198 A1 | 10/2013 |
| WO | 2015/042009 A1 | 3/2015 |
| WO | 2015/112384 A1 | 7/2015 |

OTHER PUBLICATIONS

Extended European Search Report and Opinion issued in connection with related EP Application No. 16187171.0 dated Apr. 13, 2017.
Extended European Search Report and Opinion issued in connection with related EP Application No. 16187452.4 dated Apr. 13, 2017.
Non-Final Rejection towards related U.S. Appl. No. 14/847,409 dated May 8, 2017.
Extended European Search Report and Opinion issued in connection with related EP Application No. 16164625.2 dated Aug. 29, 2016.
Extended European Search Report and Opinion issued in connection with related EP Application No. 16169984.8 dated Sep. 27, 2016.

(56) References Cited

OTHER PUBLICATIONS

Lacy et al., filed Apr. 16, 2015, U.S. Appl. No. 14/688,436.
Lacy et al., filed May 29, 2015, U.S. Appl. No. 14/725,374.
Lacy et al., filed Sep. 8, 2015, U.S. Appl. No. 14/847,409.
Lacy et al., filed Sep. 8, 2015, U.S. Appl. No. 14/847,445.

\* cited by examiner

ARTICLE AND METHOD OF FORMING AN ARTICLE

STATEMENT REGARDING FEDERALLY SPONSORED RESEARCH

This invention was made with government support under contract number DE-FC26-05NT42643 awarded by the Department of Energy. The government has certain rights in this invention.

FIELD OF THE INVENTION

The present invention is directed to an article and a method of forming an article. More particularly, the present invention is directed to a cooling article and a method of forming a cooling article.

BACKGROUND OF THE INVENTION

Turbine systems are continuously being modified to increase efficiency and decrease cost. One method for increasing the efficiency of a turbine system includes increasing the operating temperature of the turbine system. To increase the operating temperature, the turbine system must be constructed of materials which can withstand such temperatures during continued use.

In addition to modifying component materials and coatings, a common method of increasing temperature capability of a turbine component includes the use of cooling features. For example, one type of cooling feature includes an impingement member having apertures formed therein. The impingement member directs cooling fluid through the apertures and towards a surface that is intended to be cooled. However, it is often difficult to control the flow of the cooling fluid once it exits the apertures, particularly in the presence of cross-flow between the impingement member and the surface to be cooled.

To contact the surface with the cooling fluid in the presence of cross-flow, an increased amount of cooling fluid is typically passed through the apertures in the impingement member. As the cooling fluid is often provided from the compressed air in a turbine engine, passing an increased amount of cooling fluid through the apertures removes an increased portion of the compressed air prior to reaching the combustor. Removing an increased portion of compressed air may decrease efficiency and increase operating cost of the turbine engine.

An article and a method that show one or more improvements in comparison to the prior art would be desirable in the art.

BRIEF DESCRIPTION OF THE INVENTION

In an embodiment, a cooling article includes a body portion separating an inner region and an outer region, an aperture in the body portion, the aperture fluidly connecting the inner region to the outer region, and a cooling feature extending away from an outer surface of the body portion. The cooling feature disturbs fluid flow in the outer region.

In another embodiment, a cooling article includes a body portion separating an inner region and an outer region, a plurality of apertures in the body portion, the apertures fluidly connecting the inner region to the outer region, and a plurality of cooling features extending away from an outer surface of the body portion. The cooling article is arranged and disposed within a turbine nozzle, and the plurality of cooling features provide heat transfer from the turbine nozzle.

In another embodiment, a method of forming a cooling article includes forming a body portion defining an inner region and an outer region, forming an aperture in the body portion, the aperture fluidly connecting the inner region to the outer region, and forming a cooling feature extending away from an outer surface of the body portion. The cooling article is arranged and disposed for insertion within a hot gas path component of a turbine engine.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a cooling article and a method of forming a cooling article. Embodiments of the present disclosure, for example, in comparison to concepts failing to include one or more of the features disclosed herein, increase cooling efficiency, decrease cooling fluid use, increase control of fluid flow, increase efficiency of impingement fluid flow, decrease cross-flow effects on impingement fluid, increase hot wall heat transfer, provide turbulent coolant flow, increase operational lifespan, or a combination thereof.

Figure 1:
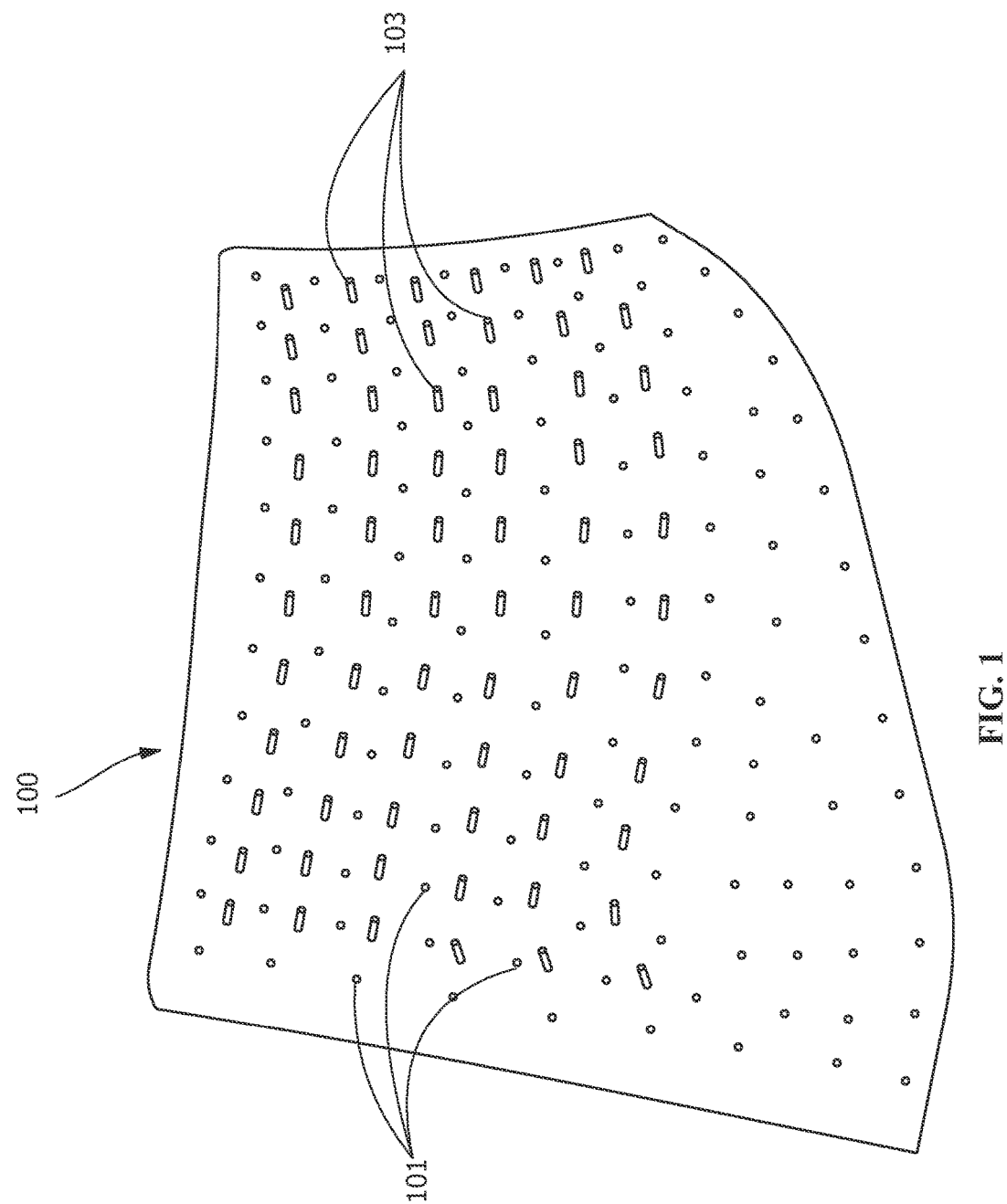
FIG. 1 is a perspective view of a cooling article according to an embodiment of the disclosure.

A cooling article 100 includes any suitable article for facilitating cooling of a turbine component. In one embodiment, as illustrated in FIG. 1, the cooling article 100 includes one or more apertures 101 formed therein and/or one or more cooling features 103 formed thereon. For example, in another embodiment, the cooling article 100 includes an impingement sleeve having a plurality of apertures 101 and/or cooling features 103. Although primarily described herein with regard to an impingement sleeve, as will be understood by those skilled in the art, the cooling article 100 may include any other suitable article, such as, but not limited to, an impingement plate, multiple impingement plates, any other article configured for insertion within a component, or a combination thereof.

Figure 2:
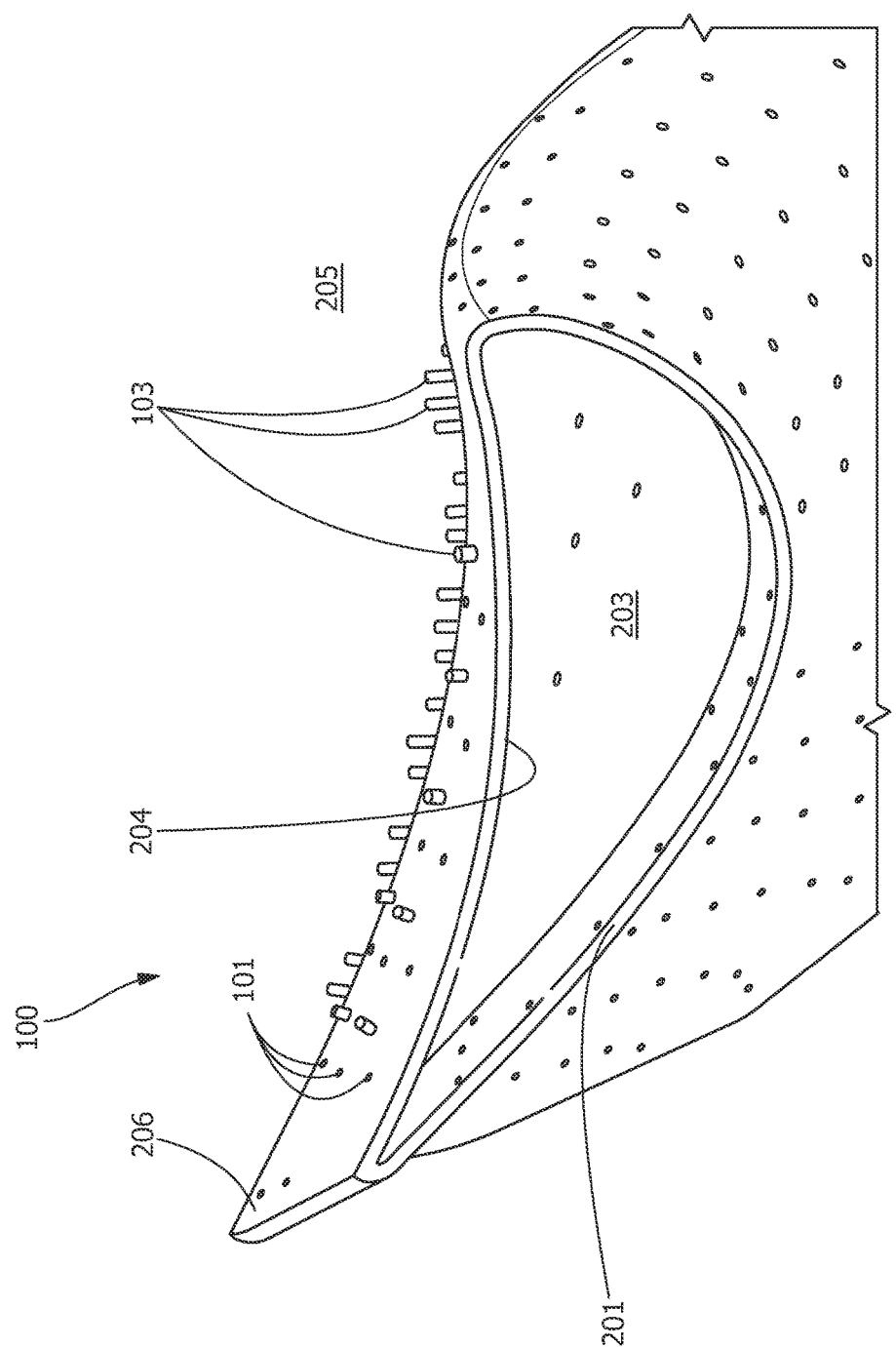
FIG. 2 is a section view of a cooling article according to an embodiment of the disclosure.

Referring to FIG. 2, a body portion 201 of the cooling article 100 defines and/or separates an inner region 203 and an outer region 205. The body portion 201 includes an inner surface 204, which faces the inner region 203, and an outer surface 206, which faces the outer region 205. In one embodiment, the one or more apertures 101 are formed in the body portion 201, fluidly connecting the inner region 203 to the outer region 205 and providing fluid flow between the inner region 203 and the outer region 205. For example, the apertures 101 may extend between the inner surface 204 and the outer surface 206, facilitating a flow of cooling fluid from the inner region 203 to the outer region 205.

Each of the apertures 101 includes any suitable geometry for fluidly connecting the inner region 203 and the outer region 205. Suitable geometries include, but are not limited to, circular, substantially circular, round, substantially round, oval, elliptical, non-round, square, triangular, star shaped, polygonal, chevron-shaped, varied, irregular, any other geometrical shape, or a combination thereof. Additionally, the apertures 101 include any suitable orientation and/or spacing for facilitating cooling flow. Suitable spacing between the apertures 101 includes, but is not limited to, even, uniform, varied, gradient, sectioned, or a combination thereof. The geometry and/or spacing of the apertures 101 may be uniform, substantially uniform, or varied throughout the cooling article 100, with the geometry and/or spacing of each of the apertures 101 being the same, substantially the same, and/or different from one or more other apertures 101 in the cooling article 100.

In another embodiment, the one or more cooling features 103 are formed on the outer surface 206, and extend away from the outer surface 206 into the outer region 205. Suitable cooling features 103 include, but are not limited to, pins 203 (FIG. 2), pin fins, bumps, dimples, shielding members 403 (FIG. 4), turbulator strips, lattice structures, any other projections and/or recesses, or a combination thereof. For example, as illustrated in FIG. 2, the one or more cooling features 103 may include a plurality of pins 203 arranged and disposed to form a pin bank. Additionally or alternatively, the cooling article 100 may include a combination of pins 203 and other cooling features 103.

Each of the cooling features 103 includes any suitable cross-sectional geometry, such as, but not limited to, circular, substantially circular, round, substantially round, non-round, star shaped, oval, square, triangular, polygonal, varied, irregular, any other geometrical shape, or a combination thereof. The cross-sectional geometry of each of the one or more cooling features 103 may be uniform, substantially uniform, or varied. For example, the cooling features 103 may form rectangles, squares, cylinders, cones, triangles, hourglass shapes, parabolic shapes, or a combination thereof. In one embodiment, the cross-sectional geometry of each of the one or more cooling features 103 is the same or substantially the same as the other cooling features 103. In another embodiment, the cross-sectional geometry of at least one of the cooling features 103 differs from the cross-sectional geometry of at least one other cooling feature 103 along the outer surface 206 of the cooling article 100. In a further embodiment, the cooling features 103 are formed in sections, the cross-sectional geometry of the cooling features 103 in at least one section differing from the cross-sectional geometry of the cooling features 103 in at least one other section.

Additionally or alternatively, other aspects of the cooling features 103, such as, but not limited to, spacing, angles, length, width, or combinations thereof, are the same, substantially the same, or varied along the outer surface 206. In one example, the spacing of the cooling features 103 may be varied to vary a density or packing of the cooling features 103. In another example, the cooling features 103 may be angled with respect to the body portion 201 and/or the outer surface 206. In one embodiment, the angle of the cooling features 103 is selected to facilitate additive manufacturing of the cooling article 100, such as, for example, by providing support to the body portion 201 during manufacturing. In a further example, the cooling features 103 include support members, such as, but not limited to, struts, ridges, and/or rods, that provide support for the cooling features 103 during additive manufacturing. The support members may form a portion of the cooling article 100, or may be removed after additive manufacturing of the cooling article 100.

Figure 3:
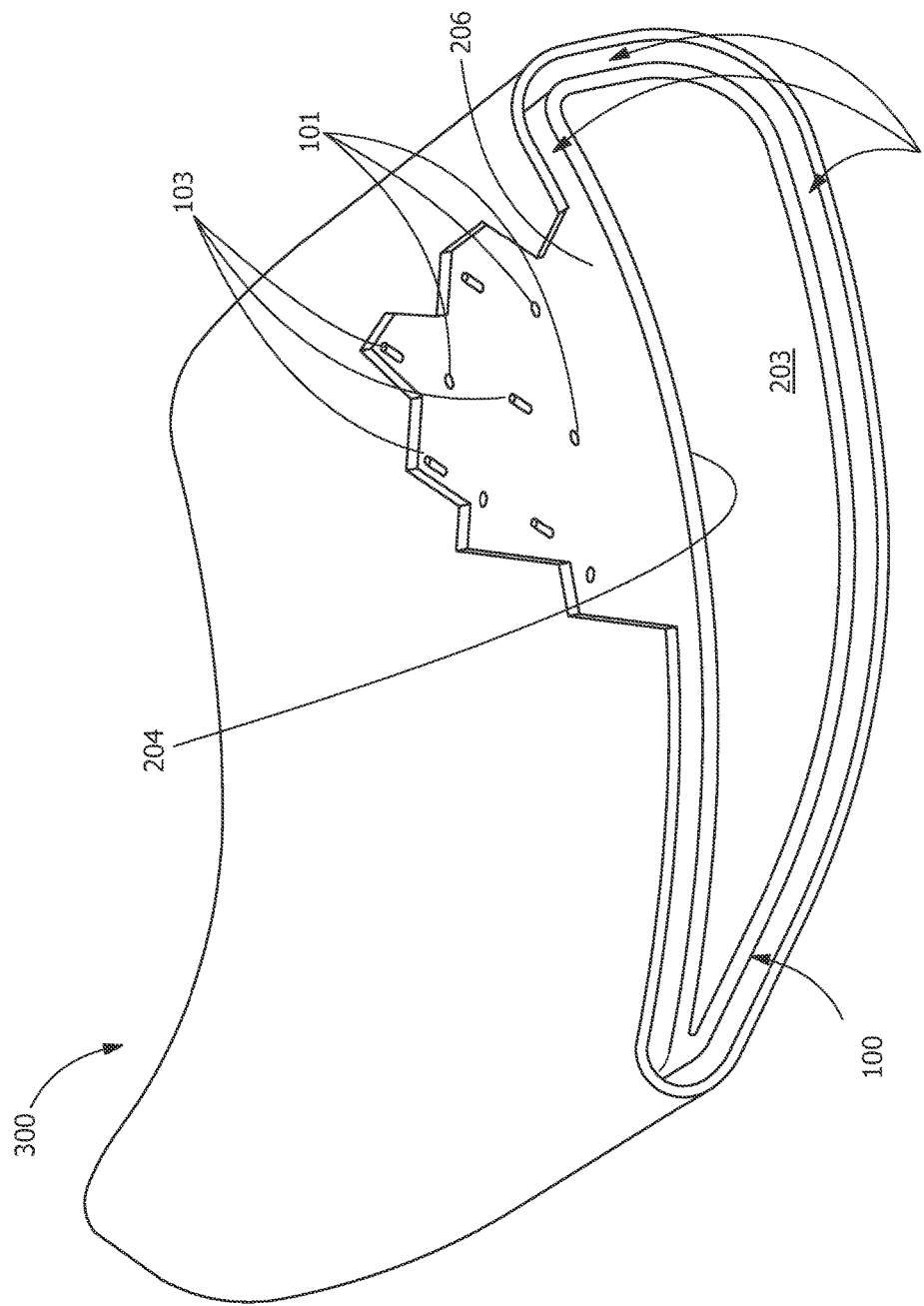
FIG. 3 is a section view of a cooling article positioned within a cooled component according to an embodiment of the disclosure.

Turning to FIG. 3, in one embodiment, the cooling article 100 is configured for insertion and/or positioning within a component 300, such as, but not limited to, a hot gas path component, a turbine nozzle, a turbine shroud, a turbine bucket or blade, a combustion component, or a combination thereof. When inserted and/or positioned within the component 300, the outer region 205 of the cooling article 100 extends between the outer surface 206 of the cooling article and an inner surface 304 of the component 300. Additionally, when the cooling article 100 is inserted and/or positioned within the component 300, the flow of fluid through the apertures 101 provides impingement cooling of the component 300. For example, a cooling fluid provided to the inner region 203 of the cooling article 100 may pass through the apertures 101 to the outer region 205 where the cooling fluid contacts the inner surface 304 of the component 300 to cool the component 300. The orientation and/or spacing of the apertures 101 at least partially determines an amount, direction, and/or concentration of the cooling fluid passing from the inner region 203 to the outer region 205.

As illustrated in FIG. 3, when the cooling article 100 is inserted and/or positioned within the component 300, the one or more cooling features 103 extend toward the inner surface 304 of the component 300. In one embodiment, the cooling features 103 are arranged and disposed to affect fluid flow within and/or through the outer region 205. In another embodiment, the one or more cooling features 103 are adjacent the inner surface 304 of the component 300, but do not contact the inner surface 304. In a further embodiment, the cooling features 103 turbulate fluid flow, such as cross-flow and/or other cooling fluid flow, within the outer region 205. The turbulating of the fluid flow within the outer region 205 increases near wall turbulence, which increases overall heat transfer from the component 300, increases cooling of the component 300, increases hot wall heat transfer, increases cooling efficiency, or a combination thereof. Additionally or alternatively, at least one of the one or more cooling features 103 contacts the inner surface 304 of the component 300, providing conductive heat transfer from the component 300.

Figure 4:
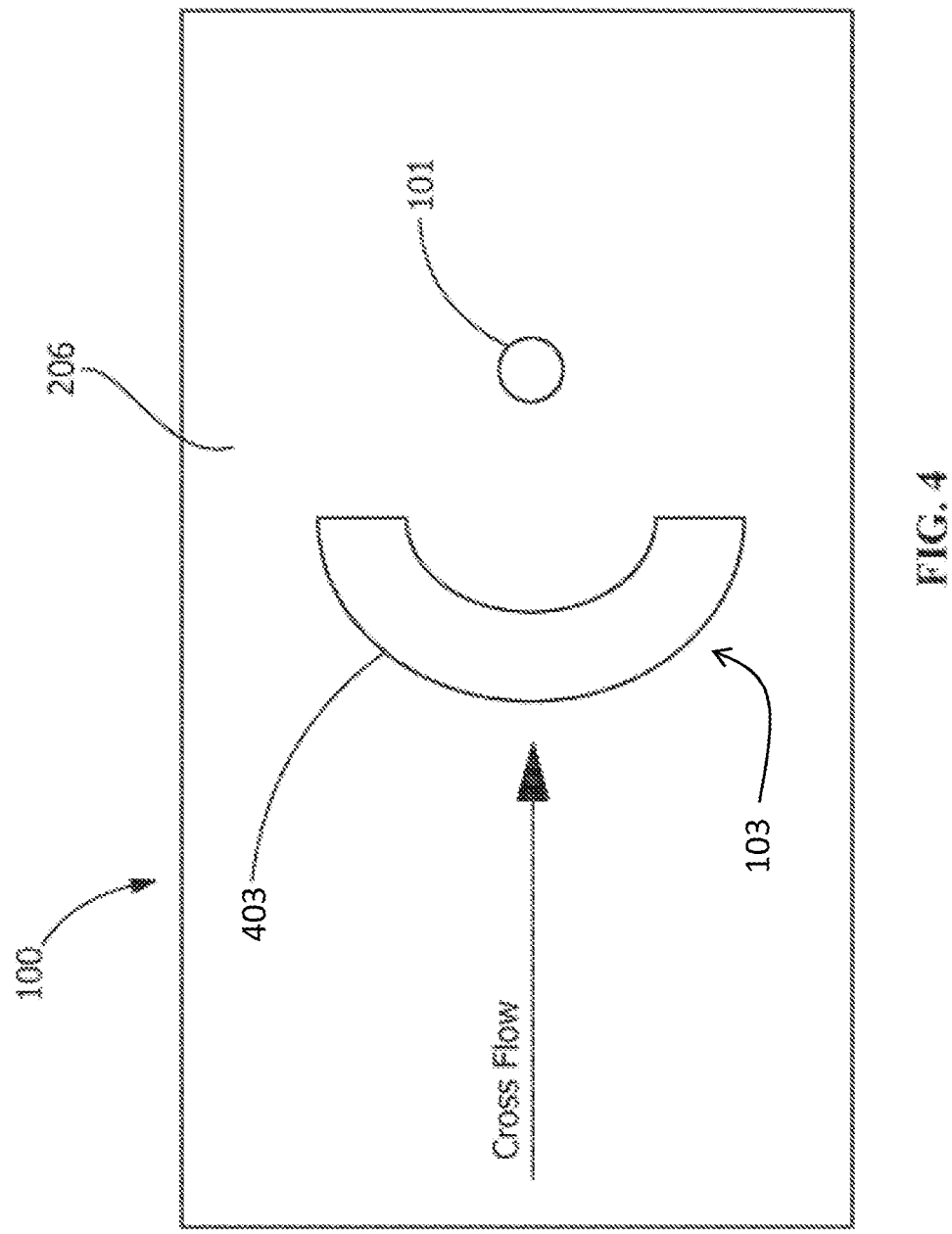
FIG. 4 is an enhanced view of a cooling feature according to an embodiment of the disclosure.

Turning to FIG. 4, in one embodiment, the one or more cooling features 103 include at least one shielding member 403 positioned relative to at least one of the one or more apertures 101. The at least one shielding member 403 may be provided in addition to, or in place of, the one or more pins 203 or other cooling features 103. In another embodiment, the at least one shielding member 403 is arranged and disposed to decrease or eliminate cross-flow effects on the cooling fluid exiting at least one of the apertures 101. For example, as illustrated in FIG. 4, the shielding member 403 may include a curved and/or semi-circular geometry configured to direct cross-flow within the outer region 205 away from the cooling fluid exiting the aperture 103. By decreasing or eliminating cross-flow effects on the cooling fluid, the shielding members 403 increase cooling fluid contact with the inner surface 304 of the component 300, increase impingement cooling efficiency, increase heat removal, provide cooling of the component 300 with a decreased amount of fluid, and/or facilitate the use of increased operating temperatures.

Figure 5:
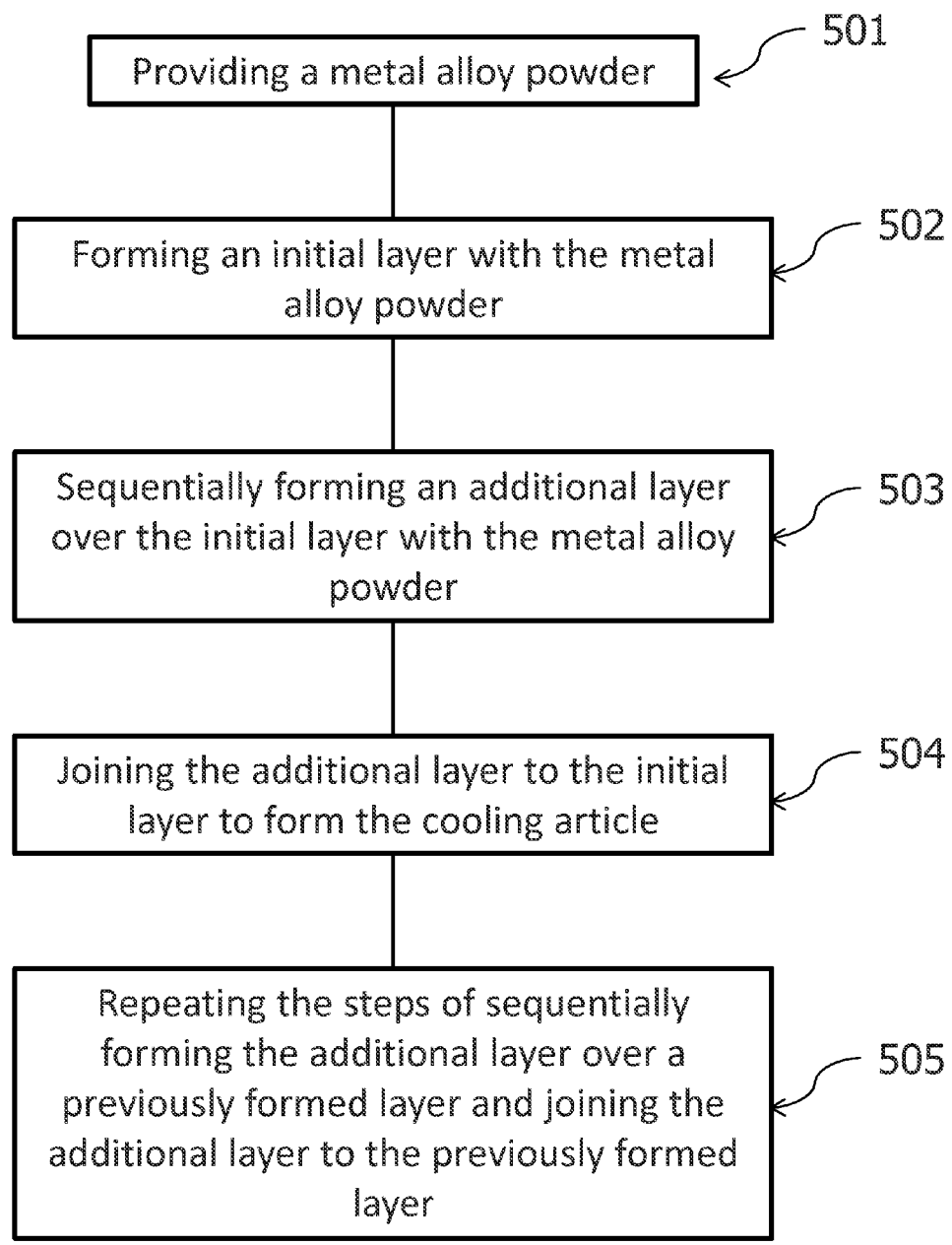
FIG. 5 is a process view of a method of forming a cooling article according to an embodiment of the disclosure.
Figure 6:
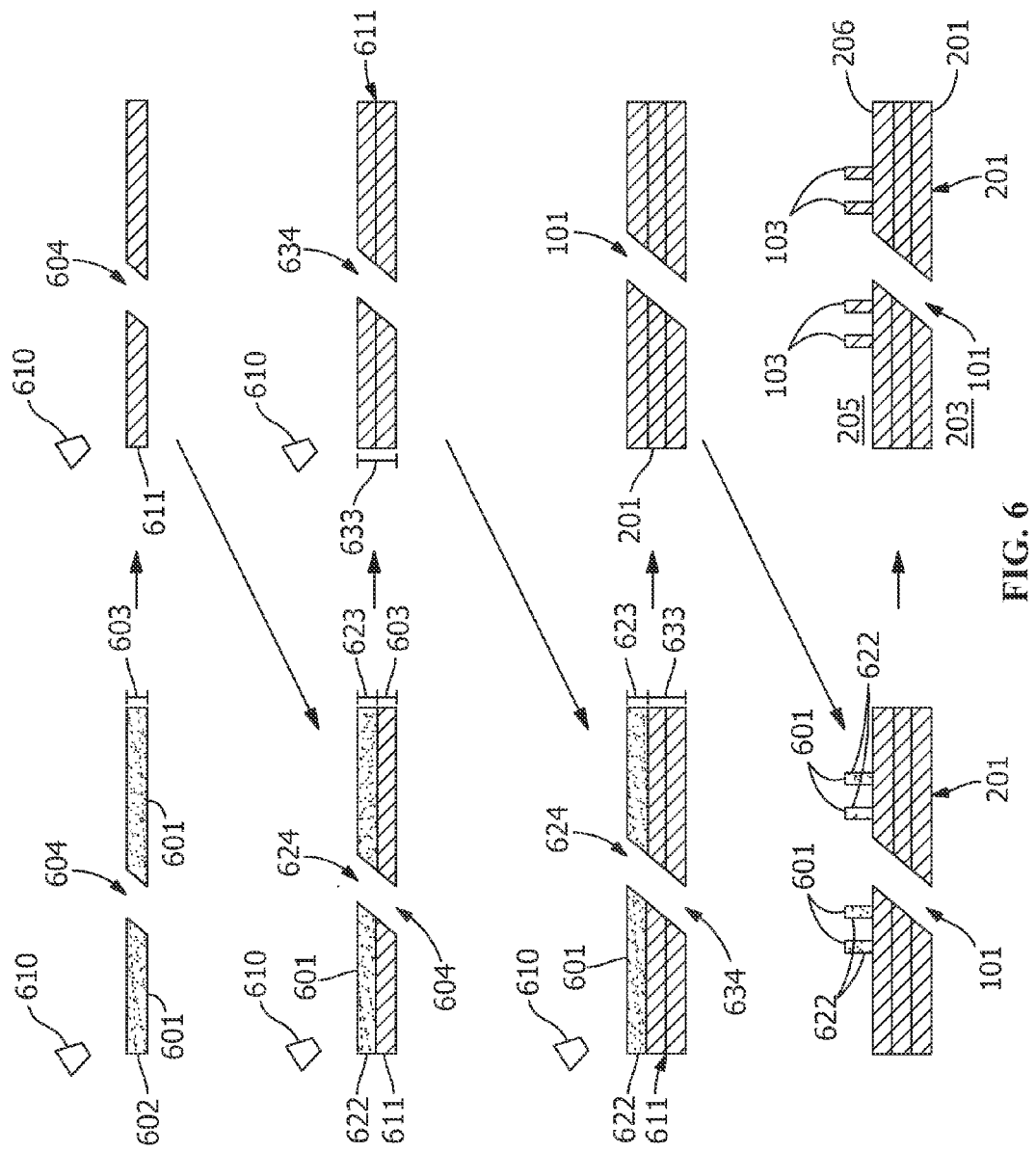
FIG. 6 is a schematic view of a method of forming a cooling article according to an embodiment of the disclosure.

In one embodiment, forming the cooling article 100 and/or the cooling features 103 includes any suitable additive manufacturing method. Referring to FIGS. 5-6, in another embodiment, the additive method 500 includes making and/or forming net or near-net shape cooling articles 100 and/or cooling features 103. As used herein, the phrase "near-net" refers to the cooling article 100 and/or cooling features 103 being formed with a geometry and size very similar to the final geometry and size of the cooling article 100 and/or cooling features 103, requiring little or no machining and processing after the additive method 500. As used herein, the phrase "net" refers to the cooling article 100 and/or cooling features 103 being formed with a geometry and size requiring no machining and processing. For example, in one embodiment, the additive method 500 includes making the cooling article 100 including the one or more aperture 101 and/or the one or more cooling feature 103. The additive method 500 provides any net or near-net shape to the cooling articles 100, the aperture(s) 101, and/or the cooling feature(s) 103. Additionally or alternatively, the additive method 500 includes forming the cooling article 100 separate from the one or more cooling feature 103, then securing the one or more cooling feature 103 to the cooling article 100. Although described with regard to the aperture(s) 101 being formed during the additive method 500, as will be appreciated by those skilled in the art, at least one of the aperture(s) 101 may be machined into the cooling article 100 after the additive method 500, without affecting the net or near-net geometry of the cooling article 100.

The additive method 500 includes any manufacturing method for forming the cooling article 100 and/or cooling features 103 through sequentially and repeatedly depositing and joining material layers. Suitable manufacturing methods include, but are not limited to, the processes known to those of ordinary skill in the art as Direct Metal Laser Melting (DMLM), Direct Metal Laser Sintering (DMLS), Laser Engineered Net Shaping, Selective Laser Sintering (SLS), Selective Laser Melting (SLM), Electron Beam Melting (EBM), Fused Deposition Modeling (FDM), or a combination thereof. In one embodiment, for example, the additive method 500 includes providing a metal alloy powder 601 (step 501); forming an initial layer 602 with the metal alloy powder 601 (step 502); sequentially forming an additional layer 622 over the initial layer 602 with the metal alloy powder 601 (step 503); and joining the additional layer 622 to the initial layer 602 to form the cooling article 100 and/or cooling features 103 (step 504). In another embodiment, the additive method 500 includes repeating the steps of sequentially forming the additional layer 622 over a previously formed layer and joining the additional layer 622 to the previously formed layer (step 505) until the cooling article 100 and/or conduit(s) 103 having a predetermined thickness and/or a predetermined shape are obtained. The previously formed layer includes any portion 611 of the cooling article 100 and/or cooling features 103 including the initial layer 602 and/or any other additional layer(s) 622 directly or indirectly joined to the initial layer 602.

The initial layer 602 includes a preselected thickness 603 and a preselected shape, which, when forming the one or more apertures 101, includes at least one first opening 604. Each of the additional layers 622 includes a second preselected thickness 623 and a second preselected shape, the second preselected shape including at least one second opening 624 corresponding to the at least one first opening 604 in the initial layer 602, a shape corresponding to the outer surface 206, and/or a shape corresponding to the one or more cooling features 103. The second preselected thickness 623 and/or the second preselected shape may be the same, substantially the same, or different between one or more of the additional layers 622. When joined, the preselected thickness 603 of the initial layer 602 and the second preselected thickness 623 of the additional layer(s) 622 form a combined thickness 633 of the portion 611. Additionally, the at least one first opening 604 and the corresponding at least one second opening 624 form one or more combined openings 634 in the portion 611. Once the cooling article 100 is formed, the one or more combined opening 634 form the one or more apertures 101 fluidly connecting the inner region 203 to the outer region 205 of the portion 611.

In one embodiment, the additive method 500 includes the DMLM process. In another embodiment, the DMLM process includes providing the metal alloy powder 601 and depositing the metal alloy powder 601 to form an initial powder layer. The initial powder layer has the preselected thickness 603 and the preselected shape including the at least one first opening 604. In a further embodiment, the DMLM process includes providing a focused energy source 610, and directing the focused energy source 610 at the initial powder layer to melt the metal alloy powder 601 and transform the initial powder layer to the portion 611 of the cooling article 100 and/or cooling features 103. Suitable focused energy sources include, but are not limited to, laser device, an electron beam device, or a combination thereof.

Next, the DMLM process includes sequentially depositing additional metal alloy powder 601 over the portion 611 of the cooling article 100 and/or cooling features 103 to form the additional layer 622 having the second preselected thickness 623 and the second preselected shape. After depositing the additional layer 622 of the metal alloy powder 601, the DMLM process includes melting the additional layer 622 with the focused energy source 610 to increase the combined thickness 633 and form at least a portion of the cooling article 100. The steps of sequentially depositing the additional layer 622 of the metal alloy powder 601 and melting the additional layer 622 may then be repeated to form the net or near-net shape cooling article 100 and/or cooling features 103. For example, the steps may be repeated until the cooling article 100 having the predetermined thickness, the predetermined shape, the one or more apertures 101, and/or the one or more cooling features 103 is obtained.

Additionally or alternatively, the one or more cooling features 103 may be formed separately from and/or after the forming of the cooling article 100. For example, the cooling features 103 may be formed directly on a previously formed cooling article 100 using the additive method 500, or the cooling features 103 may be formed separate from the cooling article 100 then attached to the cooling article 100. Forming the cooling features 103 separate from the cooling article 100 may include either the additive method 500 or a non-additive method such as machining and/or casting. The forming of the cooling article 100 and/or cooling features 103 using the additive method 500 facilitates the formation of cooling features 103 having increased complexity as compared to non-additive methods.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A cooling article comprising:
a body portion separating an inner region and an outer region;
an aperture in the body portion, the aperture fluidly connecting the inner region to the outer region; and
a cooling feature extending away from an outer surface of the body portion, the cooling feature including a semi-circular geometry;
wherein the cooling feature disturbs fluid flow in the outer region; and
wherein the cooling article is arranged and disposed for insertion within a hot gas path component of a turbine engine.

2. The cooling article of claim 1, wherein the cooling feature is selected from the group consisting of a pin, a bump, a dimple, a shielding member, and combinations thereof.

3. The cooling article of claim 1, wherein the cooling feature is positioned adjacent to the aperture.

4. The cooling article of claim 3, wherein the cooling feature is arranged and disposed to direct cross-flow away from the aperture.

5. The cooling article of claim 1, wherein the cooling article comprises a plurality of additional cooling features extending away from the outer surface of the body portion; and wherein each additional cooling feature of the plurality of additional cooling features is selected from the group consisting of a pin, a bump, a dimple, a shielding member, and combinations thereof.

6. The cooling article of claim 5, wherein the cooling feature and at least one of the additional cooling features include different geometries.

7. The cooling article of claim 5, wherein a packing of the plurality of additional cooling features varies along the body portion.

8. The cooling article of claim 1, wherein the hot gas path component is a turbine nozzle, and wherein the cooling article is arranged and disposed for insertion within the turbine nozzle.

9. The cooling article of claim 8, wherein the cooling feature is arranged and disposed to provide near wall turbulence.

10. The cooling article of claim 8, wherein the cooling feature is arranged and disposed to contact an inner surface of the turbine nozzle when the cooling article is inserted therein.

11. A cooling article comprising:
a body portion separating an inner region and an outer region;
a plurality of apertures in the body portion, the apertures fluidly connecting the inner region to the outer region; and
a plurality of cooling features extending away from an outer surface of the body portion, at least one of the plurality of cooling features including a semi-circular geometry;
wherein the cooling article is arranged and disposed within a turbine nozzle; and
wherein the plurality of cooling features provides heat transfer from the turbine nozzle.

12. A method of forming a cooling article, the method comprising:
forming a body portion defining an inner region and an outer region;
forming an aperture in the body portion, the aperture fluidly connecting the inner region to the outer region; and
forming a cooling feature extending away from an outer surface of the body portion, wherein the cooling feature includes a semi-circular geometry; and
wherein the cooling article is arranged and disposed for insertion within a hot gas path component of a turbine engine.

13. The method of claim 12, wherein the forming of the cooling feature includes arranging and disposing the cooling feature to direct cross-flow away from the aperture.

14. The method of claim 12, further comprising forming a plurality of additional cooling features extending away from the outer surface of the body portion.

15. The method of claim 14, further comprising varying a geometry of at least one of the plurality of additional cooling features.

16. The method of claim 14, further comprising varying a packing of the plurality of additional cooling features along the body portion.

17. The method of claim 14, further comprising arranging and disposing the cooling feature and the plurality of additional cooling features to turbulate a coolant flow in the outer region.

* * * * *